United States Patent Office 3,486,428
Patented Dec. 30, 1969

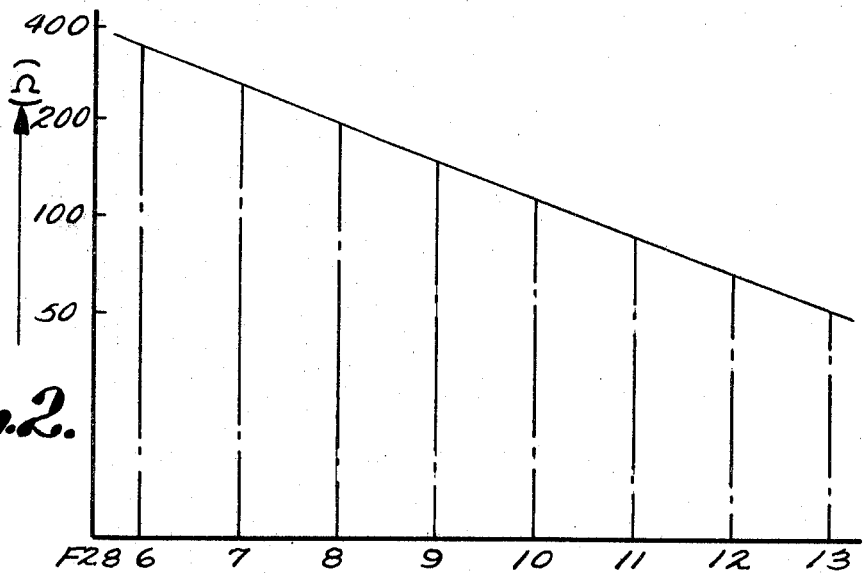

3,486,428
ELECTRIC SHUTTER FOR PHOTOGRAPHIC DEVICES
Yoshio Fukushima, Tokyo, Japan, assignor to Kabushiki Kaisha Ricoh, Tokyo, Japan, a corporation of Japan
Filed May 17, 1967, Ser. No. 639,188
Claims priority, application Japan, July 15, 1966, 41/46,223
Int. Cl. G01j 1/00, 1/52; G03b 9/00
U.S. Cl. 95—10
2 Claims

ABSTRACT OF THE DISCLOSURE

A photographic shutter mechanism for a camera wherein a time-constant circuit has a resistance heating element connected in series with a photoelectric element whereby the shutter can be checked upon to determine whether it will operate in response to the brightness of a subject to be photographed. The time constant circuit formed from the serially connected heating element and photoelectric element is further connected to an electronic switching circuit for control of an electromagnet. The electromagnet controls the operation of the camera shutter.

---

Figure 1:
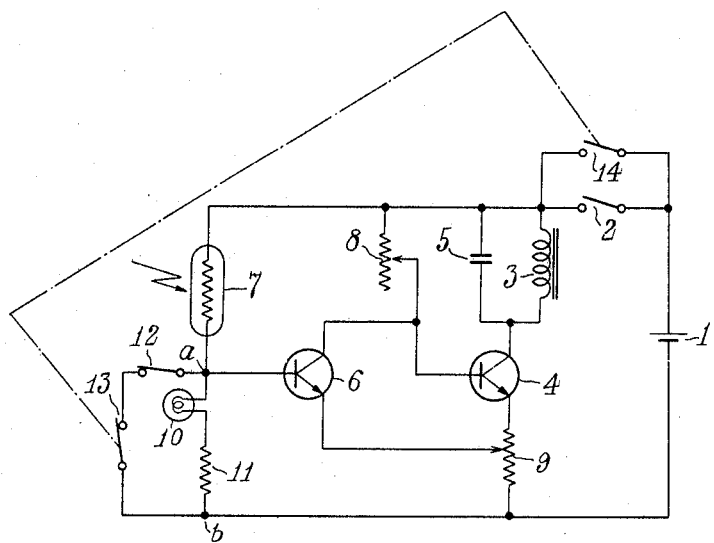

This invention relates to a photographic shutter mechanism and more particularly to an electric shutter for a camera wherein a time-constant circuit has a resistance heating element connected in series with a photoelectric element.

An object of the present invention is to provide a small-sized electric shutter for a camera.

Another object of the invention is to provide an electric shutter for a camera which can be easily checked upon to determine whether it will operate in response to the brightness of a subject or not.

An electric shutter mechanism, which comprises a photoelectric element such as cadmium sulphide (CdS), a capacitor connected in series to said element, a switching circuit with a transistor and an electromagnet for controlling the movement of a shutter blade, is well-known.

However, a heating resistor is utilized in this invention instead of the above-mentioned capacitor and the resistor is connected in series with the photoelectric element. Iron, nickel, molybdenum, tungsten, platinum or tatalum can be used as the materials of the heating resistor. Among these metals, tungsten is the best for an electric shutter and hence the invention will be explained with reference to an embodiment in which a midget lamp with a tungsten filament is connected in series with the photoelectric element.

More detailed features of the invention will appear hereinafter. The accompanying drawings show in FIGURE 1 the circuit of one embodiment of electric shutter mechanisms for a camera of the invention. FIGURE 2 shows the characteristic curves of an exemplary tungsten lamp which is 1.5 mm. in diameter, 4 mm. in length and which has a rated voltage of 2 v.; and FIGURE 3 shows the relationship of the resistance of a CdS photoelectric element with respect to object brightness, film speed and exposure time.

In the drawings, a source battery 1 is connected to an electromagnet 3 which is connected to the collector electrode of a transistor 4. A high-voltage absorbing capacitor 5 is connected to said collector electrode in parallel with said electromagnet 3, and a transistor 6 to the base electrode of which a photoelectric element 7 is connected, is coupled to variable resistors 8 and 9 for adjusting the operating voltage of the transistors. A midget lamp 10 with tungsten filament, for example, is placed between the terminal a of the photoelectric element 7 connected to the base electrode of the transistor 6 and the negative electrode terminal b of the source battery 1. An auxiliary resistor 11 is provided with the midget lamp 10, a synchro break contact 12 is provided which is engaged with the shutter mechanism to break the contact when, just before or right after the shutter blade moves to the open position. A break contact 13 is connected in series with the synchro contact 12 and a make contact 14 is connected, in parallel with the switch 2, to the source battery 1. The contacts 13 and 14 are engaged with each other and they operate together when a switch button (not shown) on the outside of the camera is pushed.

When a photograph is to be taken, the shutter button is pushed, the switch 2 is closed and the contact 12 breaks when, just before or right after the shutter is moved to the open state by means of another mechanism (not shown in the drawing). The above-mentioned opened shutter is kept open by the attractive force of the electromagnet during the time that the electromagnet is energized i.e. when transistor 4 is in the conductive state. Now, if the contact 12 is broken, electric current flows to the midget lamp 10 through the photoelectric element 7 and hence the filament of the lamp 10 is heated and the resistance of the filament is increased as well as the temperature of the same. Accordingly, the potential difference between points a and b in the drawing is gradually increased and when the potential difference gets to a prescribed value, transistor 6 is put into the conductive state. At the same time, transistor 4 is put into a nonconducting state from the conductive state. Thus, the electric current through the electromagnet 3 is interrupted and the shutter blade comes back to the rest position. The length of time that the shutter blade keeps the open position depends on the electric current through the filament of the midget lamp 10, i.e. on the time during which the potential difference between points a and b gets to said prescribed value due to the increase of filament resistance with the rise of the temperature of the filament. The electric current through the filament is determined by the resistance of the photoelectric element 7, which resistance changes in response to the brightness of the subject matter and hence the brighter the subject matter, the shorter the time during which the shutter blade is kept open, and on the contrary the darker the subject matter, the longer the time that the blade is kept open.

When the camera is directed toward the subject matter and a switch which has no relation with the release button of the shutter is pushed to break the switch 13 and close the switch 14, the electric current flows through the filament of the midget lamp 10 as well as when the shutter is open. In this case, the time when the midget lamp begins to light is determined by the resistance of the photoelectric element 7, i.e. the brightness of the subject matter, and hence the approximate value of shutter speed can be previously determined from the light-starting time. If the midget lamp does not light, although the switch button is pushed for a while, it means that enough shutter speed cannot be obtained for the previously adjusted stop or iris value, or that the subject matter is too dark for the proper exposure time. It is convenient if the state of the midget lamp can be seen through the finder of the camera.

The electric circuit of the shutter of the invention can be constructed in small size because the heating resistor is much smaller than any capacitor, and if a midget lamp is utilized as the heating resistor, it can be predetermined whether the shutter is able to operate or not, especially when, for instance, the subject matter is relatively dark. Thus, the invention has advantages which could not be obtained by the prior art.

FIGURE 2 shows the characteristic curves of a certain tungsten lamp (rated voltage: 2 v., tube: 1.5 mm. in diameter and 4 mm. in length) which may be incorporated into the circuit of this invention.

Because CdS shows a certain definite resistance value in proportion to scene brightness, a variable resistor is employed in place of CdS, for measurement convenience and the voltage between terminals $a$ and $b$ is plotted on the vertical axis and time lapse is plotted on the horizontal axis. When the transistor used in the circuit is to start working when charged with the potential of 0.65 v., the variable resistor is adjusted to 50, 67, 88, 115, 150, 200, 260 and 360 ohms, respectively, after each time lapse of 2, 4, 8, 16, 32, 64 and 128 ms. Based on these data, the characteristic of CdS for this circuit is calculated as follows: The resistance R of CdS caused by an object brightness E is formulated as follows, coefficient being put Ro:

$$R = Ro \times E^{-\gamma}$$

In this equation, $\gamma$ represents a constant inherent to each CdS being employed. As the scene brightness E is in inverse proportion to shutter time T, the above equation can be further reformulated as follows, another coefficient Ro' being employed in place of Ro:

$$R = Ro' \times T^{\gamma}$$

Putting the above-mentioned measured values in to R and T of this equation, the value of $\gamma$ can be calculated as follows:

$$\frac{67}{50} = \left(\frac{4}{2}\right)^{\gamma} = 0.42$$

$$\frac{88}{67} = \left(\frac{8}{4}\right)^{\gamma} = 0.39$$

$$\frac{115}{88} = \left(\frac{16}{8}\right)^{\gamma} = 0.30$$

$$\frac{150}{115} = \left(\frac{32}{16}\right)^{\gamma} = 0.38$$

$$\frac{200}{150} = \left(\frac{64}{32}\right)^{\gamma} = 0.41$$

$$\frac{260}{200} = \left(\frac{128}{64}\right)^{\gamma} = 0.38$$

$$\frac{260}{50} = \left(\frac{128}{2}\right)^{\gamma} = 0.39$$

Therefore, the value of $\gamma$ can be determined approximately 0.4.

As the shutter time is directly decided by the resistance value of CdS in the circuit, it is desirable that a camera incorporating the invention should be provided with some device to change the exposure area of CdS in proportion of $f$ stop value so that an appropriate shutter time be given when different $f$ stop values are given to the same object. (Such device is needless for a camera having fixed $f$ stop values). FIGURE 3 shows that when a camera is used with its $f$ stop being set at 2.8 and the exposure area of the CdS being wholly opened, a CdS which shows the resistance of 260Ω against an object whose brightness is L.V. 7 when film speed is ASA 100 and exposure index is $K=1.3$, as shown in the graph of FIGURE 3, is most suitable for the invention.

Since certain changes may be made in the above-mentioned device without departing from the scope of the invention, it is intended that all matter contained in the above description or shown in the accompanying drawing shall be interpreted as illustrative and not in a limiting sense.

What is claimed is:
1. An electric shutter for a camera comprising:
   an electromagnet maintaining the open position of the shutter;
   a switching circuit operatively associated with said electromagnet for switching the electric current to said electromagnet;
   a photoelectric element in operative relationship for adjusting the timing when electric current flows through said electromagnet in response to the brightness of the subject matter being photographed;
   a heating resistor connected in series with said photoelectric element comprising a time-constant circuit;
   a power source; and
   a switch connecting said photoelectric element and heating resistor in series to said power source.

2. An electric shutter for a camera as defined in claim 1, having a shutter button and further comprising a switch independent of the shutter button and in operative relationship to connect said photoelectric element, said heating resistor and said power source in series with one another.

References Cited

UNITED STATES PATENTS

| | | | |
|---|---|---|---|
| 3,292,515 | 12/1966 | Sato et al. | |
| 3,292,516 | 12/1966 | Sato et al. | |
| 3,295,424 | 1/1967 | Biber. | |
| 3,334,278 | 8/1967 | Atkins et al. | 317—141 |
| 3,336,850 | 8/1967 | Otani et al. | |

NORTON ANSHER, Primary Examiner

JOSEPH F. PETERS, JR., Assistant Examiner

U.S. Cl. X.R.

95—53; 250—206; 307—117; 317—124, 141